March 18, 1969  A. G. P. HASELDEN  3,433,247
HOSE REELS AND MOUNTINGS THEREFOR
Filed Feb. 24, 1966
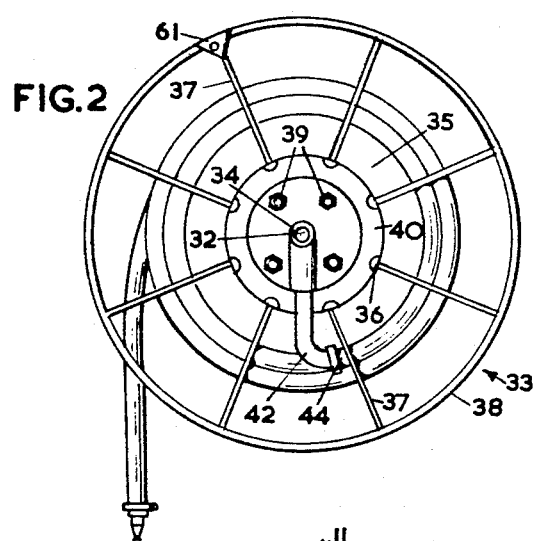
FIG.2
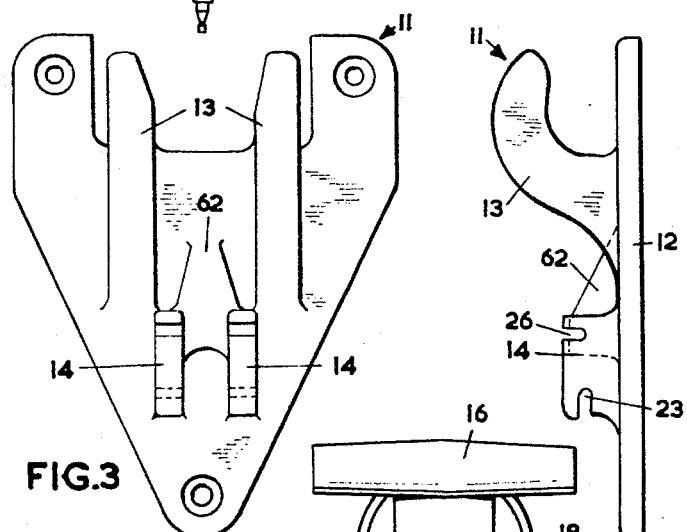
FIG.3
FIG.4
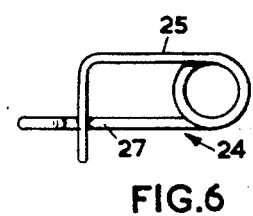
FIG.6
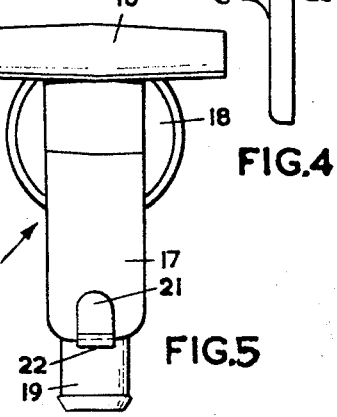
FIG.5

United States Patent Office 3,433,247
Patented Mar. 18, 1969

3,433,247
HOSE REELS AND MOUNTINGS THEREFOR
Andrew George Philip Haselden, 27 Collingwood Ave., Tolworth, Surbiton, Surrey, England
Filed Feb. 24, 1966, Ser. No. 529,802
U.S. Cl. 137—355.26                                    10 Claims
Int. Cl. F16l 3/16, 27/04

ABSTRACT OF THE DISCLOSURE

A hose reel and mounting therefor comprises a stationary support, a hose reel with a hub which is rotatable with respect to the support, and a connector-assembly between the support and the hose reel hub. The connector-assembly comprises a rotatable hollow spindle fixed in an axial water passage in the hose reel hub, a journal-bush for the spindle which journal-bush is fixed in a water passage in the support and is of bearing material, a water-tight seal at the water end of the journal-bush, and comprising a soft washer which has an interior diameter which is undersize for the spindle, and an end-thrust bearing on the water side of the seal.

---

This invention comprises improvements in hose reels and mountings therefor. Hose reels, such as are used, for example, for holding garden hose, are sometimes mounted on a stand so that they can rotate, which enables the hose to be run out easily. Normally, however, until the hose has been run out it cannot be connected to the water supply and it has to be disconnected and emptied before it can be wound up again.

It has been proposed to provide a hose reel with means whereby it may be rotatably mounted on the end of a water-supply pipe, but the constructions heretofore adopted are not satisfactory. A fitting for mounting a hose reel rotatably and simultaneously supplying water should: (a) prevent water leaks under pressure during revolution; (b) protect the bearing on which the reel rotates from access of water; (c) be free of end-play; (d) have an adequate bearing for end-thrust due to water-pressure; (e) be so designed that the reel does not produce undue unbalanced pressure on its bearing due to overhang. It is an object of this invention to provide a construction which answers all these requirements.

According to this invention, in a hose reel and mounting having as its main elements (1) a stationary support with a water supply passage therethrough and (2) a hose-reel having a hub which contains an axial water passage for connection to a hose on the reel, there is provided a connector-assembly comprising a hollow spindle, a journal-bush which is a running fit on the spindle, a seal around the spindle at one end of the bush to seal off the interior of the bush from water, an end-thrust bearing on the water side of the seal upon the spindle, means to secure the journal-bush to one of the two elements (1) and (2) with the hollow spindle in communication with the water-passage thereof and means to secure the hollow spindle in the water passage of the other element.

Preferably the means to secure the journal-bush to the one element is an outer bush which fits the end of the water passage of the said element. In one construction, the spindle is secured in the axial water passage in the hub of the reel and the outer bush is secured in the water passage of the supply fitting.

A wall-bracket may be provided which is adapted normally to carry the stationary support and the hose-reel mounted thereon, but to allow them to be lifted off the wall-bracket whenever desired.

The following is a description, by way of example, of one construction in accordance with the invention:

In the accompanying drawings,

FIGURE 2 is a rear elevation, to a smaller scale, of the hose-reel when removed from its support;

FIGURE 3 is a front elevation of the wall bracket;

FIGURE 4 is a side elevation thereof;

FIGURE 5 is a rear elevation of the stationary support for the reel, which fits on the wall-bracket; and FIGURE 6 is a detail of a latch-spring.

Figure 1:
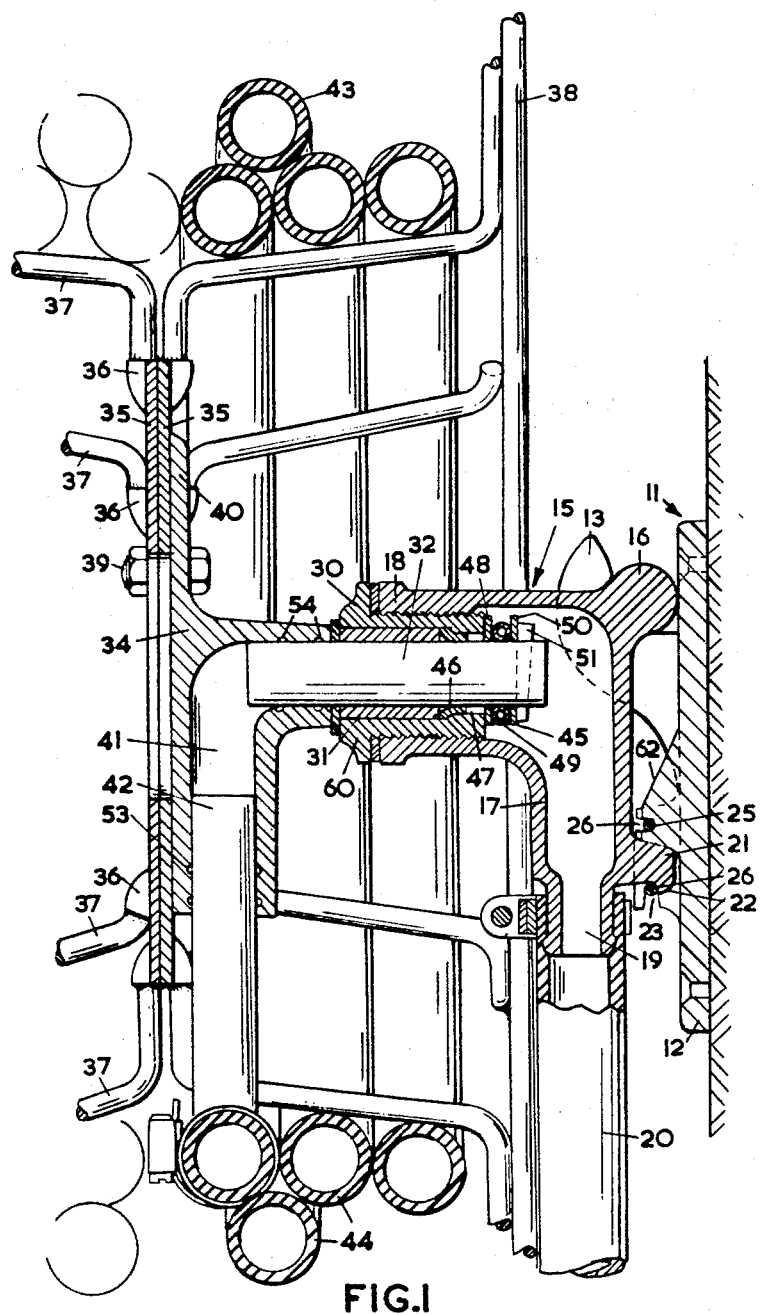
FIGURE 1 is a vertical section through a hose-reel and stationary support, mounted complete on a wall-bracket.

A wall-bracket 11 is provided, consisting of a back-plate 12 from which project forwardly and upwardly two hooks 13, spaced a little apart. Below and between the hooks is a pair of bosses 14 which provide a catch, as hereinafter more fully explained, and between the bosses is an inclined ramp 62.

A detachable stationary reel-support 15 is provided to hang on the bracket 11, consisting of a casting having the general form of a pipe-elbow with a transverse lug 16 extending across the outside corner of the elbow. The elbow 15 is narrow enough to enter between the two hooks 13 on the wall-bracket 11, and the cross lug 16 can rest in the two hooks 13, as shown in FIGURE 1. When so rested, one arm 17 of the elbow points downwardly and the other arm 18 outwardly away from the wall. The downwardly-pointing arm 17 carries a spigot 19 for attachment of a supply hose 20 for attachment to a water-supply fitting.

Near the bottom of the downwardly pointing arm of the reel-support 15 is a lug 21, to rest against the back-plate 12. This lug enters the space between the two bosses 14 on the back-plate, below the ramp 62 and it has a downwardly-hooked portion 22. When in the space, the hook 22 is behind the slots 23 in the bosses 14 and a wire spring 24 (FIGURE 6), attached to the boss, is used as a catch which holds the reel-support 15 firmly in place. The wire spring 24 is shaped like the two legs of a safety pin. The upper leg 25 is secured in slots 26 in the bosses 14 and the lower leg 27 is movable up and down in the slots 23 in the bosses 14 and engages in front of the hook 22 in the support 15. When in its normal position it engages hook 22 but when depressed it is clear of the hook and the reel-support 15 can be hinged forward and then lifted off the hooks 13. The ramp 62 helps to guide the lug 21 when the reel is being hung in place on the wall-bracket.

The horizontally-pointing arm 18 of the reel-support 15 is screw-threaded to receive a screwed bush 30 having a flanged head 60 and the bush 30 contains a further journal-bush 31 for a hollow spindle 32, which latter is attached to a hub 34 of a hose-reel 33, the hub being in such a position on the reel that the spindle 32 is co-axial with the reel. The hollow spindle 32, journal-bush 31, outer bush 30, together with an end-thrust bearing 49 and a seal 46 constitute a connector-assembly between the support 15 and the hose reel which meets all the requirements above set forth.

The hose-reel is made in two parts, each consisting of a central disc 35, made of sheet metal, having a series of eight bulges 36 pressed outwardly round its edge, to receive the inner ends of wire spokes 37. The spokes are welded in the bulges and they extend first radially outwards, then in an inclined direction and then again radially outwards until they reach the rim 38, to which they are welded. The two halves of the hose-reel are similar and are assembled by putting the two halves together with the discs 35 face to face and with a flange 30 on the hub 34 against them and then securing them together by four bolts and nuts 39. This construction makes a very light and simple reel, which is important as reducing the load on the journal-bush 31 and as it brings the bush as far as possible into the interior of the reel, it reduces overhanging weight. Another advantage is the reel is easily dis-assembled and then the two halves fit closely together if one is reversed and placed over the other. This enables large numbers to be stored in little space.

At one point in the rim of the reel, a plate 61 is welded between the rim and the end of one of the spokes 37, which plate contains a hole for attachment of a winding handle of conventional type. The hollow spindle 32 is of stainless steel and the water passage in the hub 34 has an axial portion which fits over the end of the spindle. At the other end of the water passage a pipe 42 is fitted and acts as spigot for connection to a hose 43 on the reel, as shown at 44, FIGURE 2. The members 32 and 42 are secured in the hub by means of a suitable epoxy-resin adhesive and the hub has annular recesses 53–54 around the tubes to give the adhesive a good key. The journal-bush 31 is of self-lubricating alloy and is shorter than the outer bush 30 so as to leave an annular space 45 around the spindle 32 at the end which lies within the reel-support 15. In this annular space 45 there is inserted a rubber or like sealing-ring 46, held in place by a shoulder 47 on the inside of the bush. Sealing ring 46, as manufactured is a flat washer with an external diameter which is oversize for the interior of bush 30 and an internal diameter which is undersize for spindle 32. When the sealing ring is pushed into place against shoulder 47 it tends to be deformed to a conical shape and when the bush 31 is pushed on to spindle 32 the sealing ring is further deformed as shown and makes a simple but effective high pressure seal. It not only prevents leakage but shields the journal bearing of bush 31 from the water and ensures that its self-lubricating properties are effectively used.

It will be noted that the space 45 is closed in by a washer 48 which bears against the end of bush 30 and prevents entry of foreign matter. Behind washer 48 is a flexible O-ring 49 and behind this is a second washer 50, which is held in place by a split-pin 51. The washers take the thrust of the water pressure and the O-ring prevents end-play and takes up wear.

In the result, the hose-reel 33 can rotate freely and without looseness on the support 15, whether the water pressure is on or off and the hose can be wound or unwound accordingly while the reel is hanging on its support with the water pressure turned on or off. If the support is removed from the wall-bracket and rested on the ground, the hose can still be wound or unwound.

While the reel and its support have been described in relation to garden hose, it will be understood that the invention can also be applied to fire-hose or hydraulic pressure hose for supply of pressure water to tools and the like, or for the supply of water on the decks of ships or to other hose in any position desired.

I claim:

1. A hose reel and mounting therefor comprising a stationary support with a water passage therethrough, a hose reel with a hub which is rotatable with respect to the support and which contains an axial water passage for connection to a hose on the reel, and a connector-assembly between the support and the hose reel hub, the connector-assembly comprising a rotatable hollow spindle fixed in the axial water passage in the hose reel hub, a journal-bush for the spindle which journal-bush is fixed in the water passage in the support and is of bearing material, a water-tight seal around the spindle at the water end of the journal-bush to preclude the entry of water between the journal-bush and the spindle, which water-tight seal is a sealing ring comprising a soft washer which has an interior diameter which is undersize for the spindle, and an end-thrust bearing on the water side of the seal which end-thrust bearing holds the journal-bush on the spindle.

2. A hose reel and mounting therefor as claimed in claim 1 in which there is a short length of flexible hose attached to the water passage in the support through which hose water may be supplied to the said water passage in the support.

3. A hose reel and mounting therefore as claimed in claim 1 in which the hose reel comprises two central discs capable of being bolted together and from each of which there extend spokes which are bent so that the spokes form both the support for a hose and the sides of the reel.

4. A hose reel and mounting therefore as claimed in claim 1 in which the journal-bush is fixed in the water passage in the support by means of an outer bush which is secured to the adjacent end of the water passage in the support.

5. A hose reel and mounting therefor as claimed in claim 4 in which the end-thrust bearing comprises a washer assembly comprising two washers and a resilient ring therebetween, which washers and ring surround the spindle, and means which urge the washer assembly against the inner end of the outer bush.

6. A hose reel and mounting therefor as claimed in claim 4 in which the water-tight seal is located in the outer bush, in a portion of the outer bush which projects beyond the journal-bush.

7. A hose reel and mounting therefor as claimed in claim 6 in which the sealing ring has an external diameter which is oversize for the interior of the outer bush and which is held against the adjacent end of the journal-bush by a shoulder on the inside of the outer bush.

8. A hose reel and mounting therefor as claimed in claim 1 in which there is a wall bracket adapted to releasably support the mounting and the hose reel thereon.

9. A hose reel and mounting therefor as claimed in claim 8 in which the wall bracket is provided with two hooks spaced apart to receive the support therebetween and the support has a cross-member to engage the hooks and a lug projecting towards the wall bracket to engage the wall bracket and to hold the axis of the reel horizontal.

10. A hose reel and mounting therefor as claimed in claim 9 in which there is a spring catch member to releasably secure the said lug in fixed relation with the wall bracket.

References Cited

UNITED STATES PATENTS

| | | | |
|---|---|---|---|
| 495,720 | 4/1893 | Birdsall | 137—355.19 |
| 600,274 | 3/1898 | Stewart | 137—355.19 |
| 988,766 | 4/1911 | Frigon | 133—355.26 |
| 1,653,708 | 12/1927 | Howie | 285—275 |
| 1,971,165 | 8/1934 | Parker | 137—355.26 |
| 2,301,208 | 11/1942 | Gear | 137—355.2 XR |
| 2,339,245 | 1/1944 | Bates | 137—355.26 XR |
| 2,519,064 | 8/1950 | Palm | 137—355.19 |
| 2,696,406 | 12/1954 | Myers | 285—281 XR |
| 2,781,055 | 2/1957 | Jackson | 285—281 XR |
| 3,110,453 | 11/1963 | Becker et al. | 137—355.19 XR |

SAMUEL SCOTT, *Primary Examiner.*

U.S. Cl. X.R.

285—275